United States Patent [19]

Miller

[11] 3,843,846

[45] Oct. 22, 1974

[54] DEMOUNTABLE CAPACITIVE PROTECTIVE COUPLING FOR PICKUP TRANSDUCERS

[75] Inventor: Michael Evans Miller, Indianapolis, Ind.

[73] Assignee: RCA Corporation, New York, N.Y.

[22] Filed: Feb. 8, 1973

[21] Appl. No.: 330,727

[52] U.S. Cl. .................. 179/100.4 M, 179/100.1 B, 179/100.41 G

[51] Int. Cl. .......................... H04r 19/06, G11b 9/06

[58] Field of Search............. 179/100.4 M, 100.1 B, 179/100.41 G, 100.2 K, 100.41 P, 100.41 B; 274/38

[56] References Cited

UNITED STATES PATENTS

| | | | |
|---|---|---|---|
| 2,422,140 | 6/1947 | Sinnett | 179/100.1 B |
| 2,432,444 | 12/1947 | Roberts | 179/100.41 G |
| 2,754,372 | 7/1956 | Weathers | 179/100.41 G |
| 2,877,420 | 3/1959 | Ehat | 179/100.4 M |
| 3,711,641 | 1/1973 | Palmer | 179/100.2 K |
| 3,783,196 | 1/1974 | Stanley | 179/100.4 M |

FOREIGN PATENTS OR APPLICATIONS

| | | | |
|---|---|---|---|
| 1,181,275 | 11/1964 | Germany | 179/100.1 B |

*Primary Examiner*—Bernard Konick
*Assistant Examiner*—David K. Moore
*Attorney, Agent, or Firm*—Eugene M. Whitacre; J. B. Hayes; William H. Meagher

[57] ABSTRACT

To protect a playback stylus against excessive charge flow, a capacitor is provided in series circuit relationship with the electrode of the stylus assembly. The capacitor is formed of cooperating respective elements on the stylus assembly and a supporting tracking arm which are demountably intercoupled.

4 Claims, 5 Drawing Figures

DEMOUNTABLE CAPACITIVE PROTECTIVE COUPLING FOR PICKUP TRANSDUCERS

The present invention relates to video playback systems. More particularly, it relates to an arrangement of providing demountable capacitive coupling of the playback transducer with the tracking arm in such systems.

In certain video disc playback systems, video information is recorded by means of geometric variations in the bottom of a spiral groove on the surface of a disc record. The disc surface includes a conductive material covered with a thin coating of dielectric material. A tracking stylus engages the spiral groove and includes a conductive surface or electrode which cooperates with the conductive material and dielectric coating to form a capacitor. Systems of this type are shown in a United States Patent Application, Ser. No. 126,678, now U.S. Pat. No. 3,783,196, filed Mar. 22, 1971, for Thomas Osborne Stanley and entitled, "HIGH-DENSITY INFORMATION RECORDS AND PLAYBACK APPARATUS THEREFOR;" and a United States Patent Application, Ser. No. 126,772, filed Mar. 22, 1971, for Jon Kaufman Clemens and entitled, "INFORMATION RECORDS AND RECORDING/-PLAYBACK SYSTEMS THEREFOR." Both applications are assigned to RCA Corporation.

In systems of the above-described type, as the record is rotated, an edge of the conductive electrode of the stylus, while riding in the disc groove, cooperates with the record to establish capacitive variations due to the geometrical variations in the spiral groove. The capacitor formed by the record and stylus is coupled to a tuned circuit. Consequently, as the record is rotated, the resulting capacitive variations vary the resonant frequency of the tuned circuit. The tuned circuit is energized by a fixed frequency oscillator. As the resonant frequency of the tuned circuit varies (due to the geometrical variations in the spiral groove), the response of the tuned circuit to the excitation signal voltage changes as a function of the recorded information. This provides output signals whose amplitude varies as a function of the recorded information.

The stylus electrode of an electrostatic video disc type pickup is typically very thin. For example, the stylus electrode thickness may be 4,000 A or less. The stylus electrode, therefore, may be damaged by the passage through it of large electrical charge flow or currents. Such currents may be encountered if the stylus electrode discharges electrical charges accumulated on a section of the record.

The occurrence of charges on the record can be reduced by providing a conductor connected to electrical ground which physically contacts the metallized record surface. However, it has been found that such physical contact grounding of the record, while advantageous, may not protect the stylus electrode under all conditions. For example, the record surface may become scratched in a way that leaves a portion of the metallized surface isolated and thereby able to accumulate charge.

In addition, it is desirable that the tracking arm and stylus pickup assembly be simple in construction, reliable, and replaceable, by a relatively untrained user, without the need to make difficult electrical connections. By providing a conductive path to the stylus electrode, which does not require ohmic contacts upon replacement of the stylus assembly, the chance for intermittent or noisy contact is reduced.

In accordance with a feature of the invention, a capacitance is provided in series circuit arrangement with the stylus electrode which cooperates with the record surface. Thus, only a charge sufficient to charge the series capacitance to the voltage of the record surface is passed through the stylus electrode. Without the provision of such a capacitance, the entire charge stored on the record surface may be conducted through the stylus electrode with the probability of resultant damage to the stylus.

In accordance with a further feature of the invention, the capacitance is provided in the form of a pair of conductive members. One conductive member is secured to the tracking arm, with the other conductive member secured to the stylus assembly. Demountable mechanical means which intercouple the stylus assembly with the tracking arm, dispose the pair of conductive members in proximate spaced relation to form the desired capacitance.

A complete understanding of the invention can be obtained from the following detailed description thereof, when taken in conjunction with the accompanying drawings, in which.

Reference is now made to the drawings wherein like reference numerals designate similar elements in various views.

Figure 1:
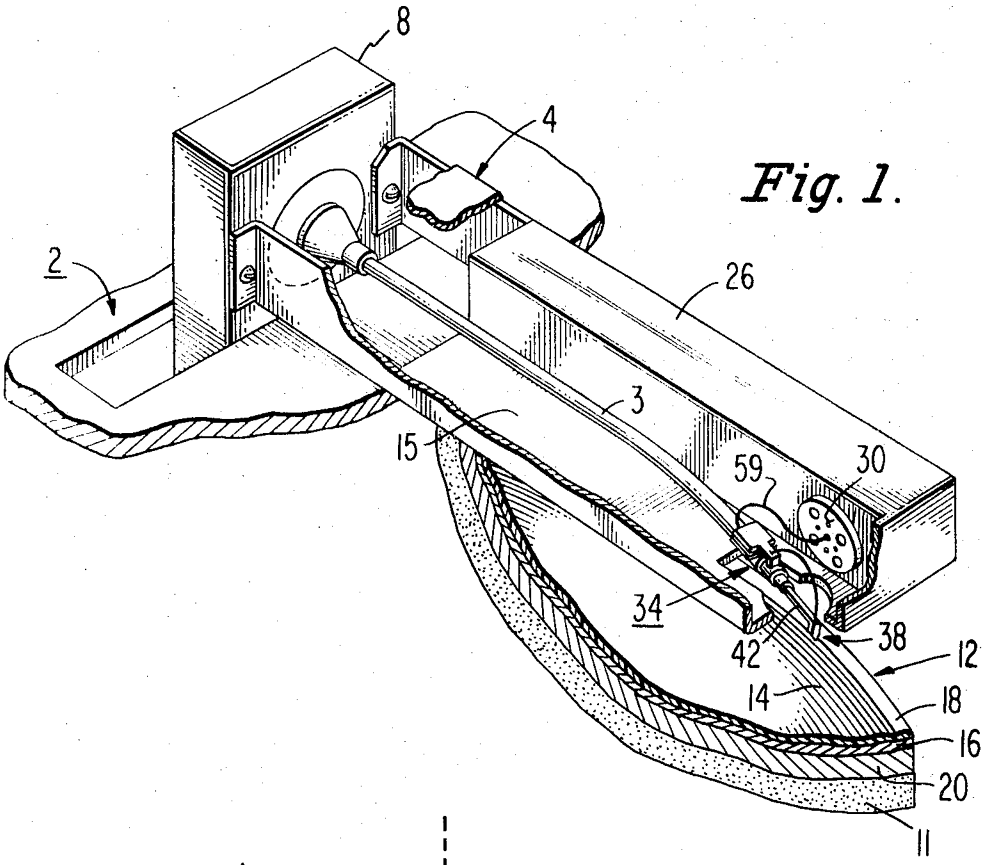
FIG. 1 is a perspective view of a video playback system embodying the invention.
Figure 2:
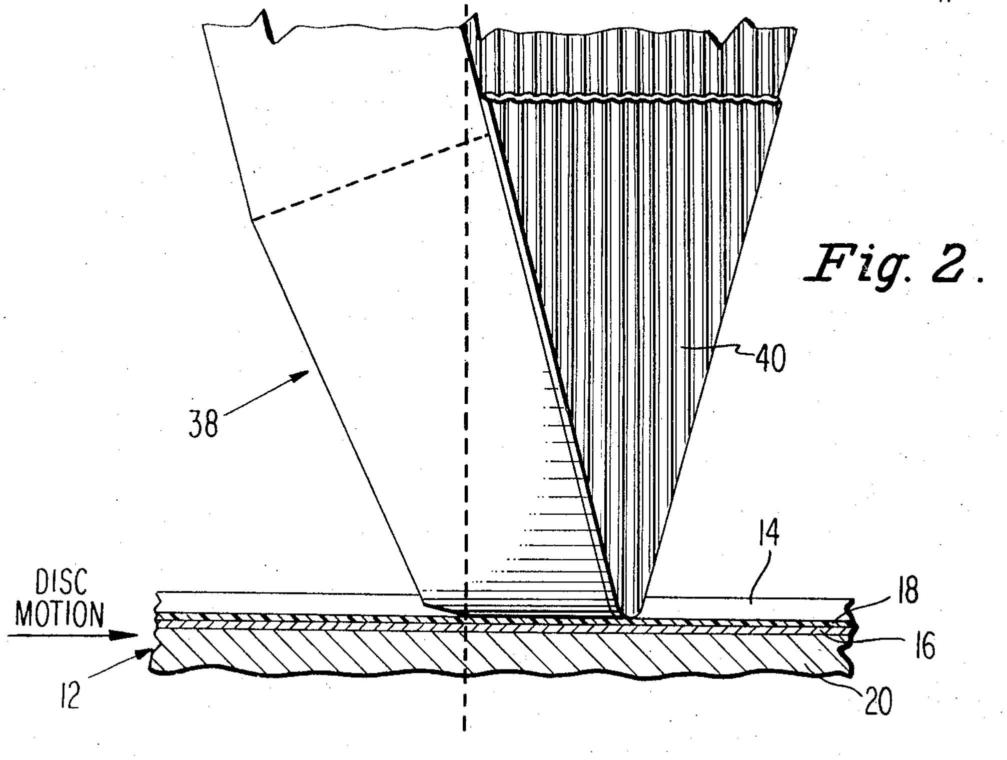
FIG. 2 is a greatly enlarged longitudinal section view of a portion of a record medium groove and a partial perspective view of a tracking stylus of a video disc type playback system.
Figure 5:
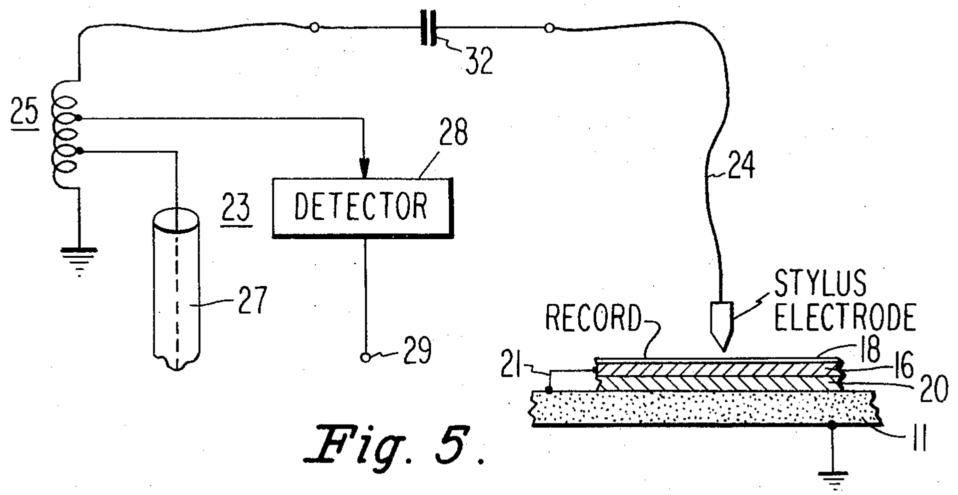
FIG. 5 is a schematic diagram in simplified form, showing an embodiment of the electrical interconnection of the stylus assembly with signal processing circuitry.

More particularly, referring to FIGS. 1, 2 and 5, a video playback system 2 includes a conductive housing 4 enclosing a tracking arm 3 and pickup assembly 6. The conductive housing 4 is mounted to a support member 8 which encloses a groove velocity error correction drive mechanism. A velocity error correction mechanism is described in detail in United States Patent Application, Ser. No. 126,797, filed Mar. 22, 1971, for Richard Claxton Palmer, now patent number 3,711,641, and entitled "VELOCITY ADJUSTING SYSTEM," which is assigned to RCA Corporation. The system includes a turntable 11 supporting a video disc record 12. The video disc record is of the type having video information recorded by means of geometrical variations (not shown) in a spiral groove 14 on the surface of the record. The record 12 includes a thin dielectric 18 covering a conductive material 16 which is disposed on a dielectric substrate 20.

A stylus 38 engages the spiral groove 14. As shown more clearly in FIG. 2, the stylus 38 includes a support for a conductive electrode 40 which cooperates with the conductive material 16 and dielectric coating 18 on the disc record to form a capacitance. Such a stylus is described in a United States Patent Application, Ser. No. 286,657, filed Sept. 6, 1972, for Marvin Allan Leedom and Michael Evans Miller and entitled, "Information Playback System Stylus." This patent application is also assigned to RCA Corporation. As the video disc record 12 is rotated, the conductive surface 40 of the stylus 38, while riding in the disc groove 14, cooperates with the record to establish capacitive variations due to the geometrical variations in the spiral groove. The signal capacitance formed by the video disc record 12 and the stylus conductive electrode 40 is electrically coupled, as is shown schematically in FIG. 5, to signal processing circuitry 23. A return path for the signal capacitance is through an electrical connection 21 between the conductive record layer 16 and a grounded conductive turntable 11. Alternatively such a return path may be through the capacitance of the conductive layer 16 and a conductive turntable 11. The signal processing circuitry of FIG. 5, has a tuned circuit 25 which includes a point of ground potential. The circuitry of FIG. 5 is housed within a conductive compartment 26 of the conductive housing 4 of FIG. 1. The tuned circuit is energized via lead 27 from a fixed frequency oscillator of known type which is not shown. For example, the frequency may be in the hundreds of MHz. Since the fixed frequency oscillator signals are applied to the tuned circuit whose resonant frequency varies during operation, the response of the tuned circuit to the excitation signal voltage changes as a function of the recorded information. A detector means 28, such as a diode, is provided for monitoring these changes. This results in an output signal at terminal 29 whose amplitude varies as a function of the recorded information. Further discussion of such arrangements may be found in United States Patent Application, Ser. No. 295,854, for Stephen Earl Hilliker and entitled, "VIDEO DISC TRANSMISSION LINE AND STYLUS RF RETURN SYSTEMS," assigned to RCA Corporation. The conductive compartment 26 may be sealed by a plate 30 having openings for passage of a conductor.

As shown in FIGS. 1 and 5, a capacitive element 32 is connected in series circuit relation with the stylus and tuned circuit. Thus, in the arrangement shown, an electrical path is provided from the stylus electrode through the capacitance of element 32 to the tuned circuit 25. With such an arrangement only a charge sufficient to charge the capacitive element 32 to the voltage of the record surface need be passed through the electrode of the stylus. That is, $Q = CV$, where: $Q$ is the charge which flows in Coulombs, C is the capacitance in Farads of the series capacitor and V is accumulated voltage of the record to which the capacitor charges.

Advantageous protection of the stylus is afforded by utilizing a capacitive element 32 having a small value of capacitance which limits the transfer of charge. However, the capacitive element 32 is in series connection with the variable signal capacitance, i.e., the variation of capacitance between the stylus electrode and the metallized surface of the record. Therefore, it is also desirable that the capacitance value of the element 32 should be substantially larger than the signal capacitance and the stray capacitance associated with the stylus electrode, its support and its associated lead, in order to minimize the loss of playback sensitivity.

Figure 3:
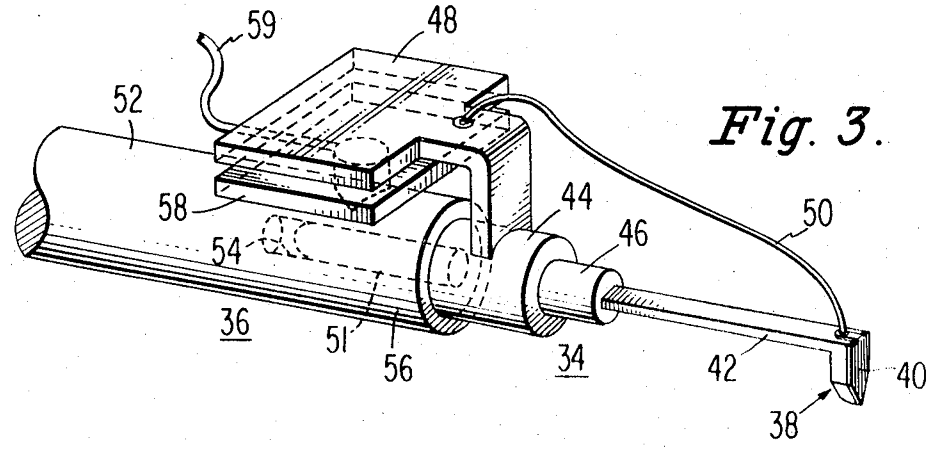
FIG. 3 is an enlarged perspective view showing details of the tracking arm-stylus assembly interface portion of the embodiment of FIG. 1.

FIG. 3 shows details of an arrangement for providing mechanical support and electrical coupling of the stylus assembly 34 and a tracking arm 36. As shown, the stylus 38, including a conductive electrode 40, is secured to one end of a rod 42. The opposite end of rod 42 is coupled to a generally cylindrical member 44 by means of a compliant element 46. The element 46 is an elastomer, such as rubber, and provides pivotal movement of the stylus for record tracking purposes.

Secured to the cylindrical member 44 is a generally flat electrically conductive plate-like element 48. The plate element 48 is secured to the member 44 in a cantilevered manner, with the element 48 extending away from the member 44 in generally parallel relation to the rod 42. A preferably flexible conductor 50 electrically connects the stylus electrode 40 to the plate 48. The conductor 50, for example, may be formed of a beryllium copper wire or a gold coated mylar strip. The connections for the conductor 50 may be made by solder or other suitable means.

Figure 4:
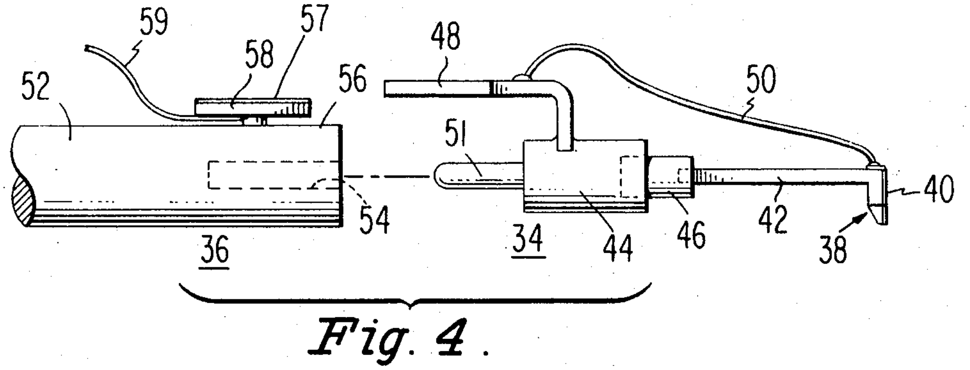
FIG. 4 is a side elevation view of the arrangement of FIG. 3, showing the stylus assembly demounted from the tracking arm.

As shown in FIG. 4, the stylus assembly 34 includes a locating or alignment pin portion 51 which protrudes from the member 44. The portion 51 provides demountable connection of the stylus assembly to the tracking arm as further described below.

The tracking arm assembly 36 includes a support arm 52. One end of the arm 52 is supported for tracking by suitable means such as shown in FIG. 1. A recess or aperture 54, as shown in FIG. 4, is provided in the end 56 of the arm 52. The aperture 54 is adapted to receive the pin portion 51 and thereby support the stylus assembly 34 in a demountable manner.

A further generally flat electrically conductive plate-like element 58 is fixedly secured to the arm 52 in the vicinity of end 56. A conductor 59 is provided for electrical connection to the plate element 48.

The mounting of plate element 58 disposes it in generally parallel juxtaposed spaced relation with the plate element 48, when pin portion 51 is received in the aperture 54. The plate elements 48 and 58 form the terminals or electrodes of a capacitive element which is in series circuit relation with the electrode 40 of the stylus assembly 38. If desired, proper spacing between the conductive plates 48 and 58 may be established by a layer of dielectric material between the plates. As shown by way of example, in FIG. 4 a coating 57 of a dielectric material, such as a plastic film, is disposed on the conductive plate member 58.

It has been found that potentials on the record in the 10 volt range are hazardous to the stylus. A capacitance value of approximately one or two picofarads for the element 32 has been found to be suitable for protection of the stylus against record potentials in the order of 300 volts. Other typical values are in the range of 0.001 pf (picofarads) for the signal capacitance, on the order of 0.25 pf for the stray lead capacitance, and 0.05 pf for the stylus support stray capacitance.

For example, the two conductive plate elements 48 and 58 are made each with an area of 0.1 square inches. With a spacing of 0.00025 inches between the plates, a capacitance of approximately 2 pf is provided. Such a capacitance value is sufficient coupling for the signal but small enough to limit charge flow to a safe value through the stylus electrode.

In the described arrangements supra, the electrical path for protection of the stylus is to be through the series connected path which includes the capacitive element. Thus, if conductive materials are utilized for portions of the stylus assembly and/or the tracking arm, it will be understood that suitable insulating portions are provided to inhibit parallel charge flow paths for the stylus electrode.

In FIG. 5, one terminal of the capacitive element 32 is connected to a point of reference potential, such as electrical ground, through the signal processing circuitry. It is to be noted that the capacitive element terminal not coupled to the stylus electrode may be in alternative manner directly connected or coupled through other suitable means to a point of reference potential such as electrical ground.

What is claimed is:

1. In a system for effecting playback of a disc record having geometrical variations in spiral groove form on a major surface thereof, the combination comprising: an arm pivotally mounted at one end thereof, a stylus assembly including a conductive stylus electrode adapted for entry in said record groove; a first conductive member secured to an end of said arm remote from said one end; signal processing means electrically coupled between said first conductive member and a point of reference potential; a second conductive member secured to a segment of said stylus assembly remote from said stylus electrode and electrically coupled to said stylus electrode; said stylus assembly segment and said remote end of said arm subject to mechanical engagement in an operating relationship providing support for said stylus assembly by said arm during record playback, and subject to manual release from said engagement for facile disassembly of said arm and said stylus assembly; the mechanical engagement of said stylus assembly segment and said remote arm end in said operating relationship effecting a juxtaposition of said conductive members in a substantially parallel relationship of substantially fixed spacing; an electrical coupling of a direct current blocking character being provided between said stylus electrode and said signal processing means during record playback by a capacitance of substantially fixed value established between said conductive members, said coupling being provided without hindrance to said disassembly.

2. In a playback system for use with a disc record having geometrical variations in a spiral groove on a major surface thereof, said record including a deposit of conductive material covered with a coating of dielectric material, the combination comprising: a stylus assembly including a conductive electrode which engages said record groove and further cooperates with the conductive material and dielectric coating of said disc record to form a varying capacitance as said disc record is rotated; a tracking arm having a first end pivotally mounted and a second end having a recess therein; a first generally flat conductive member secured to said arm in the vicinity of said second end; signal processing means electrically coupled between said first conductive member and a point of reference potential; a second generally flat conductive member secured to said stylus assembly and electrically coupled to said stylus electrode; said stylus assembly further including a protruding portion adapted to be received in the recess of said second end of said arm under operating conditions to provide demountable support of said stylus assembly from said second end of said arm, with said first and second conductive members in proximate spaced relation to form a capacitive element of substantially fixed value, said capacitive element providing an electrical signal path, independent of said variable capacitance, for coupling said stylus electrode to said signal processing means.

3. The invention according to claim 2 wherein said stylus assembly includes a rod member, means securing said conductive electrode to a first end of said rod, a resilient member providing flexible coupling between a further end of said rod and said protruding portion, and said first and second conductive members supported in cantilevered manner from said arm and said protruding portion respectively.

4. The invention according to claim 2 wherein each of said first and second conductive members comprise a metal plate having a major surface area, said major surface areas being relatively spaced under said operating conditions to provide a capacitance value in the order of 2 picofarads.

* * * * *